Sept. 24, 1957     T. A. WIEDEMANN     2,807,219
HIGH SPEED FOLLOWER GAUGE TROLLEY STRUCTURE
Original Filed Sept. 20, 1950     3 Sheets-Sheet 1

INVENTOR
Theodore A. Wiedemann.
BY
ATTORNEYS.

Sept. 24, 1957 T. A. WIEDEMANN 2,807,219
HIGH SPEED FOLLOWER GAUGE TROLLEY STRUCTURE
Original Filed Sept. 20, 1950 3 Sheets-Sheet 2
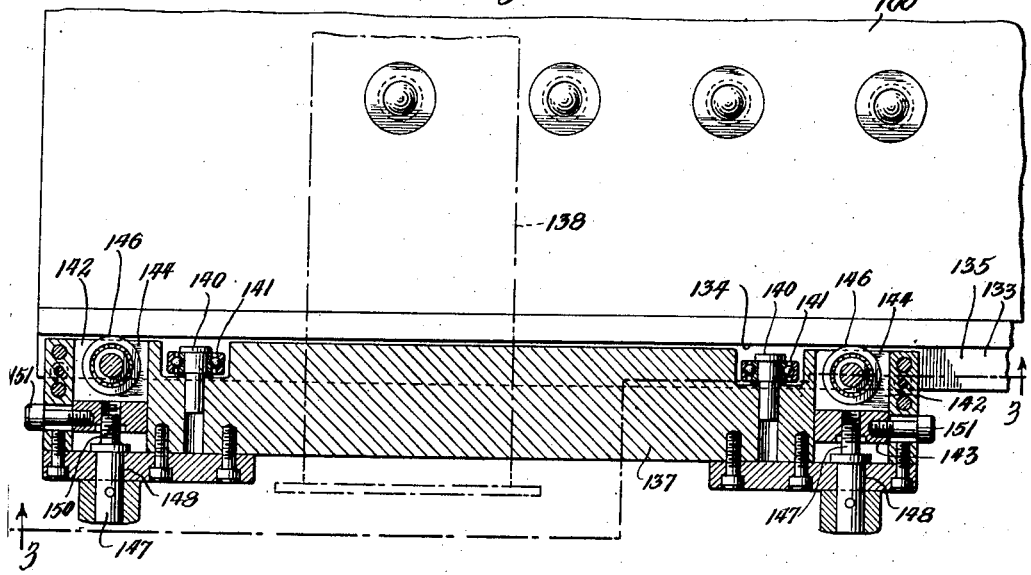
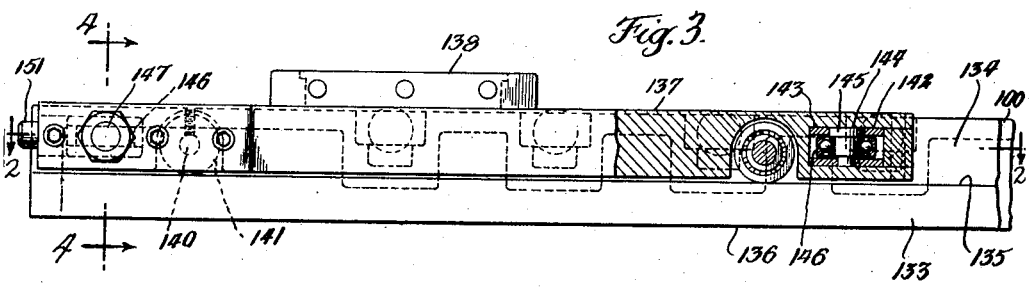
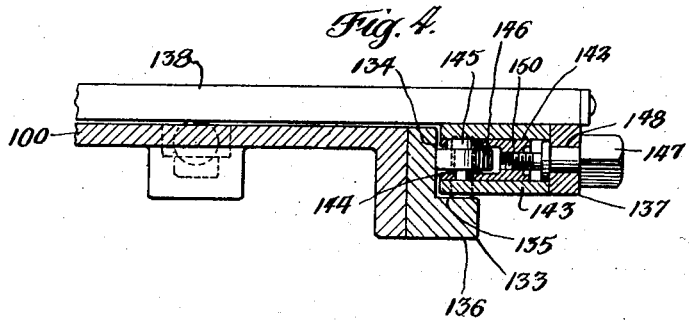
INVENTOR
Theodore A. Wiedemann.
BY
ATTORNEYS Sept. 24, 1957 T. A. WIEDEMANN 2,807,219
HIGH SPEED FOLLOWER GAUGE TROLLEY STRUCTURE
Original Filed Sept. 20, 1950 3 Sheets-Sheet 3
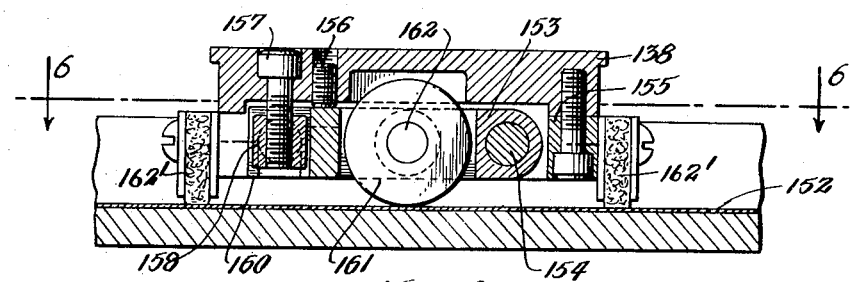
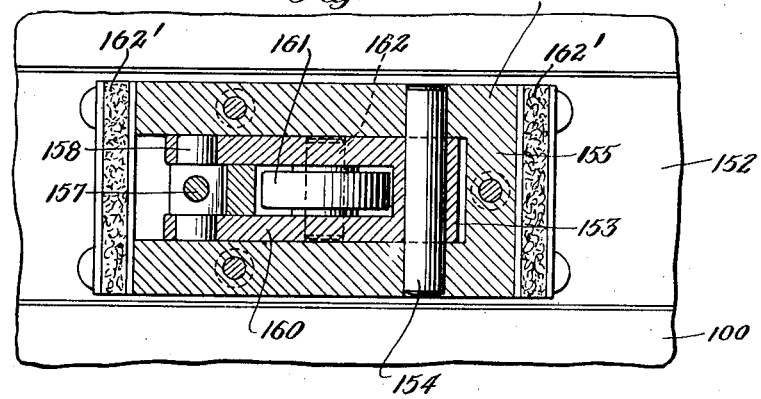
INVENTOR
Theodore A. Wiedemann.
BY
ATTORNEYS

United States Patent Office 2,807,219
Patented Sept. 24, 1957

2,807,219

HIGH SPEED FOLLOWER GAUGE TROLLEY STRUCTURE

Theodore A. Wiedemann, Norristown, Pa., assignor to Wiedemann Machine Company, Philadelphia, Pa., a corporation of Pennsylvania Original application September 20, 1950, Serial No. 186,160, now Patent No. 2,701,017, dated February 1, 1955. Divided and this application September 18, 1953, Serial No. 381,058

2 Claims. (Cl. 104—247)

The present invention relates to control mechanism which can be employed in instruments of high precision such as machine tools, especially turret punch presses.

The present application is a division of Serial No. 186,160, filed September 20, 1950, for High Speed Follower Gage and Punch, now United States Patent No. 2,701,017, granted February 1, 1955. The reader is referred to this patent for a more complete description of the entire mechanism.

The subject matter relating to the clamp is embodied in divisional application Serial No. 609,391, filed September 12, 1956, for High Speed Follower Gage Control Clamp.

A purpose of the invention is to manipulate a trolley mechanism with accurate movement in space with respect to reference lines, and with a minimum of deflection or distortion, so that the position of a bar or the like carried by the trolley mechanism can be used to accurately predetermine the control position.

A further purpose is to provide rails at either side of the bed having upwardly directed surfaces and laterally directed surfaces, to mount trolleys supporting the gauge bar and cooperating with the rails, to position first spaced rollers on each trolley engaging the upwardly directed rail surfaces and to position second spaced rollers on each trolley engaging the laterally directed rail surfaces, desirably with slide adjustments for the second rollers toward and away from the laterally directed rail surfaces.

A further purpose is to provide gauge bar tracks beneath the gauge bar and third rollers on the gauge bar engaging the gauge bar tracks, preferably mounting the third rollers in adjustable cradles.

A further purpose is to provide precise adjustment, both for set-up purposes and to compensate for wear, on all of the units of the machine which require adjustment.

Further purposes appear in the specification and in the claims.

In the drawings I have chosen to illustrate one only of the numerous embodiments in which my invention may appear, with a variation, the form and variation shown being chosen from the standpoints of convenience in illustration, satisfactory operation and clear demonstration of the principles involved.

Figure 2 is an enlarged plan section of one of the trolleys employed in the machine of the invention, the section being taken on the line 2—2 of Figure 3, and the gauge bar being located in dot-and-dash lines.

Figure 3 is partially a side elevation of Figure 2 and partially a section on the line 3—3 of Figure 2.

Figure 4 is a cross section on the line 4—4 of Figure 3.

Figure 5 is an enlarged cross section of a roller support and track on the line 5—5 of Figure 1.

Figure 6 is a plan section on the line 6—6 of Figure 5.

Figure 1:
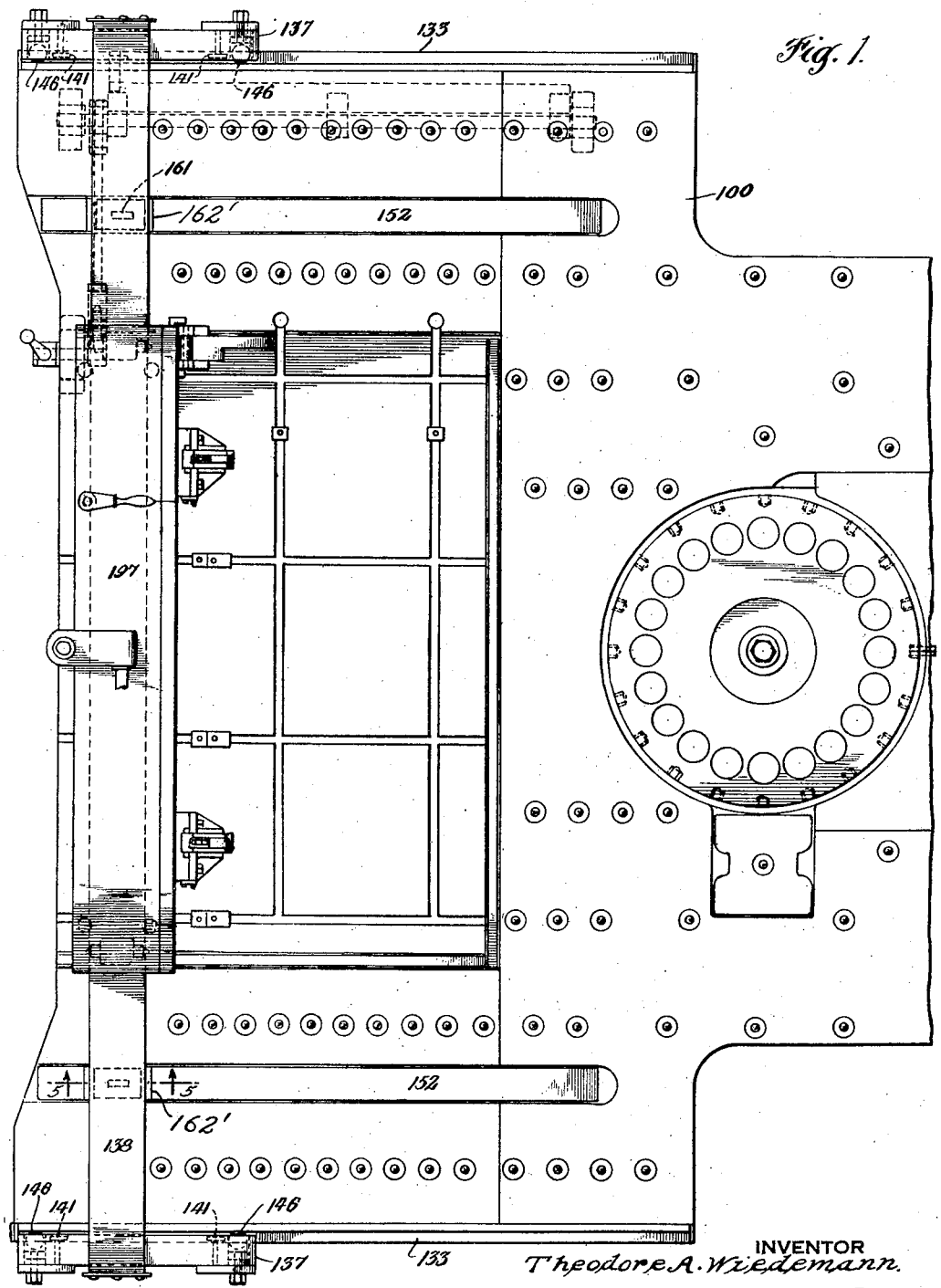
Figure 1 is a fragmentary enlarged top plan view of the device of the invention looking down on the table level of Figure 1.

Describing in illustration but not in limitation and referring to the drawings:

For many purposes, as in machine tools, for example turret punch presses, it is important to be able to move one object, for example the work, in precise relation to reference points or lines, conveniently those provided by an accurately located template. In the present invention a gage bar carries a cross slide, and the gage bar is moved by trolleys over side rails with auxiliary support from tracks. In accordance with the invention, the tendency of one trolley or one end of the gage bar to move ahead to the other and thus destroy the precision of the motion is avoided by providing for relative adjustment of trolley rollers in two planes at right angles to one another. Likewise the tendency of the gage bar to sag or distort is compensated by adjustment of rollers engaging the tracks.

More specifically, the trolleys at the ends of the gauge bar are desirably provided with rollers bearing down on the rails and rollers bearing in on the rails from the side, the side rollers being adjustable. To guard against undue flexibility of the gauge bar, tracks are provided on the bed which are engaged by rollers located between the trolleys.

The device of the invention includes a work table 100 having a suitably horizontal bed on which a gage bar is to move with precision as later explained.

The table has at its opposite sides fixed rails 133 extending in exact parallelism with a suitably lateral locating surface and exactly transversely to a suitable longitudinal locating surface. The rails as best seen in Figures 2 to 5 inclusive are of L section, and comprise laterally (outwardly) facing surfaces 134, upwardly facing surfaces 135 and downwardly facing surfaces 136.

The rails 133 are engaged at the sides of the table by trolleys 137 which support a gauge bar 138 extending across the bed parallel to the longitudinal locating surface and transverse to the rails. Each trolley has mounted at two spaced points, stub shafts 140 extending inwardly above the upwardly directed rail portion 135, and carrying precision ball bearing rollers 141 which support the weight of the trolleys and gauge bar and ride the upwardly directed portion 135 of the rails. Each trolley also has extending inwardly spaced slides 142 in guideways 143. The slides have yoke inward ends 144 and mount axles 145 which support precision ball bearing rollers 146 which ride the outwardly directed rail portions 134. The rollers 146 are subject to precise adjustment to position the trolleys and gauge bar accurately on the rails, adjusting screws 147 journalling in bearings 148 and making threaded connection with the outer portions of the yokes at 150. To hold the yokes and rollers in any adjusted position, locking screws 151 are provided at the ends in elongated slots.

At intervals between the rails, depressed upwardly directed tracks 152 are provided on the bed parallel to rails 133, which bear part of the weight of the gauge bar. As best seen in Figures 5 and 6, the gauge bar at points cooperating with the tracks has forwardly and rearwardly extending cradles 153 pivotally mounted at 154 in a bearing support 155 secured to the bottom of the gauge bar. Each cradle is held in lower position by an adjusting screw 156 and is pulled upwardly by a clamping screw 157 extending through the gauge bar and threading at the lower end into a trunnion 158 pivotally mounted in yoke arms 160 of the cradle. Rollers 161 ride the track 152 and journal on pins 162 in the cradles. The track, rollers and cradles extend parallel with the rails. To keep the track free from grit, felt wipers are provided at 162'.

The gage bar supports and guides a suitable cross slide 197.

In operation it will be understood that the template is properly located with respect to the table and the cross slide carrying the work and the guide bar manipulating the cross slide must move accurately in a predetermined path one at right angles to another. Each of the adjustments should be properly made so that all parts work freely without play. Thus as shown in Figures 2 to 4, the rollers which engage the sides of the rails should be adjusted in the trolleys to maintain firm contact without binding.

The rollers 161 which ride the tracks 152 should be adjusted as to height to prevent distortion and provide adequate support for the gauge bar.

Adjustment should be made of the position of the template with respect to the cross slide and the lateral locating surface should be properly adjusted on the cross slide.

Once all adjustments have been made, a check should be made to be sure that the longitudinal locating surface of the template is at the same projected distance from the tool axis as the longitudinal locating surface of the work is from the stylus, and if any difference exists this should be corrected, conveniently by readjusting the stylus position. Likewise a check should be made to be sure that the lateral locating surface of the template is the same distance from the tool axis as the lateral locating surface of the work is from the stylus, and if any difference exists the lateral work locating surface should be readjusted.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention what I claim as new and desire to secure by Letters Patent is:

1. In a machine tool trolley mechanism adapted to be manipulated with precision, a bed, rails extending generally horizontally on either side of the bed and mounted thereon, having upwardly directed surfaces and having laterally directed surfaces, trolleys on either side cooperating with the rails, first rollers spaced in the direction of longitudinal motion on each trolley engaging the upwardly directed rail surfaces, second rollers on each trolley spaced in the direction of longitudinal motion of the trolleys, engaging the laterally directed rail surfaces, a bar extending over the bed and secured to and movable with the trolleys, tracks beneath the bar mounted on the bed and running parallel to the rails, third rollers beneath the bar engaging the tracks, cradles pivoted on the bar on a horizontal axis longitudinal of the bar and providing rotatable mounting for the third rollers, and adjustment mechanisms raising and lowering the ends of the cradles remote from the pivots of the cradles on the bar and thereby adjusting the pressure exerted by the third rollers on the tracks.

2. In a machine tool trolley mechanism adapted to be manipulated with precision, a bed, rails extending generally horizontal on either side of the bed and mounted thereon, having upwardly directed surfaces and having laterally directed surfaces, trolleys on either side cooperating with the rails, first rollers spaced in the direction of longitudinal motion on each trolley engaging the upwardly directed rail surfaces, second rollers on each trolley spaced in the direction of longitudinal motion of the trolleys, engaging the laterally directed rail surfaces a bar extending over the bed and secured to and movable with the trolleys, at least one track beneath the bar mounted on the bed and running parallel to the rails, a third roller beneath the bar engaging the track, a cradle pivoted to the bar on a horizontal axis longitudinal of the bar and providing rotatable mounting for the third roller, and an adjustment mechanism raising and lowering the end of the cradle remote from the pivot of the cradle on the bar and thereby adjusting the pressure exerted by the third roller on the track.

References Cited in the file of this patent

UNITED STATES PATENTS

| | | |
|---|---|---|
| 465,491 | Osborne | Dec. 22, 1891 |
| 661,663 | Kottgen | Nov. 13, 1900 |
| 737,410 | Jackman | Aug. 25, 1903 |
| 846,339 | McRaven | Mar. 5, 1907 |
| 931,431 | Kilgore | Aug. 17, 1909 |
| 1,373,754 | Miller | Apr. 5, 1921 |
| 1,740,726 | Case | Dec. 24, 1929 |
| 1,764,797 | Kersting | June 17, 1930 |
| 1,829,358 | Kintner | Oct. 27, 1931 |
| 1,918,905 | Grimm | July 18, 1933 |
| 2,104,185 | Clausen | Jan. 4, 1938 |
| 2,304,924 | Jackson et al. | Dec. 15, 1942 |
| 2,503,120 | Meyer | Apr. 4, 1950 |
| 2,718,194 | Ruhlmann | Sept. 20, 1955 |